Dec. 6, 1966  F. L. STAATS  3,289,977
AIRCRAFT DEVICE
Filed Jan. 11, 1965  3 Sheets-Sheet 1

INVENTOR.
F. L. STAATS
BY
ATTORNEY

INVENTOR.
F. L. STAATS
BY
ATTORNEY

Dec. 6, 1966    F. L. STAATS    3,289,977
AIRCRAFT DEVICE
Filed Jan. 11, 1965    3 Sheets-Sheet 3

INVENTOR.
F. L. STAATS
BY
ATTORNEY

United States Patent Office 3,289,977
Patented Dec. 6, 1966

3,289,977
AIRCRAFT DEVICE
Francis Lloyd Staats, River Road, Belle Mead, N.J.
Filed Jan. 11, 1965, Ser. No. 424,521
10 Claims. (Cl. 244—23)

This invention relates to an aircraft device, motivated by a system of thrust valves (thrust valve, jet pump, by-pass venturi, speed ring venturi being used herein synonymously) incorporating the principle of using a small stream of high velocity air to induce a flow of ambient air of sufficient quantity and direction to create a thrust force of ample mass to lift and/or propel the aircraft.

Thrust valves used may be either and/or of the sonic, subsonic, trans-sonic or super-sonic type, the configuration to be determined by the characteristic desired. The individual valves of this invention have inlet, ambient air pick up, and exhaust portions.

Actual control of attitude, lift and speed are attained by a system of priority ducting and flow control of pressurized and ambient air and/or aerodynamically.

Stabilization may be internally gyro controlled and/or internally or externally aerodynamically controlled.

The center of pressure of the lift or propulsion area can be changed by variation of the contour and/or variation in the combination of types and sizes of thrust valves and variation of the cluster arrangement from full honeycomb to random placement.

The drawings, illustrating procedures and devices useful in carrying out the invention, and the description below, are exemplary only of the invention, which shall be deemed to cover all other devices and procedures coming within the scope and purview of the appended claims.

In the drawings, wherein similar reference characters indicate like parts:

Figure 1:
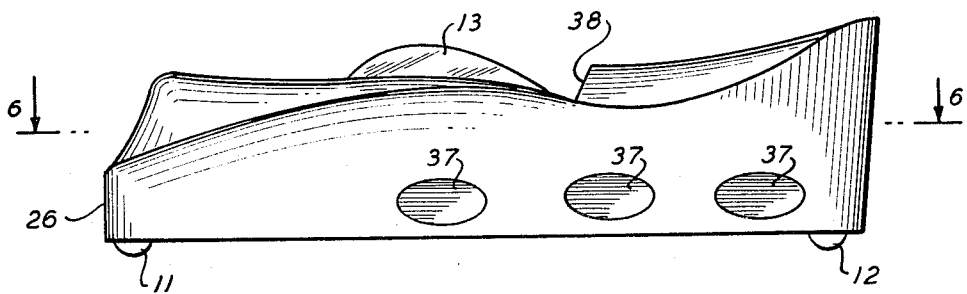
FIG. 1 is a side elevational view of an aircraft embodying the invention.
Figure 2:
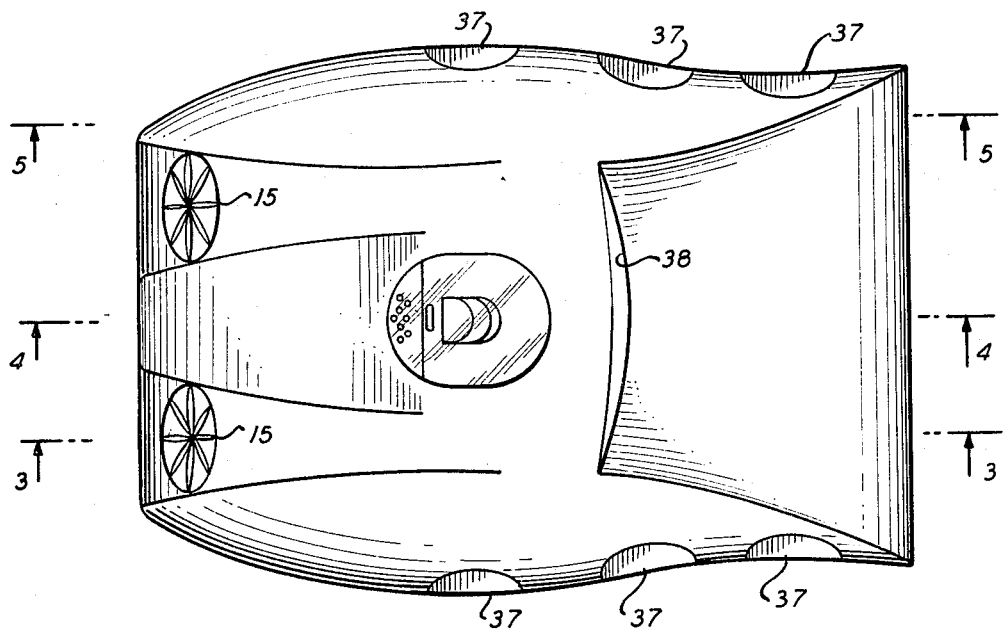
FIG. 2 is a top plan view thereof.
Figure 3:
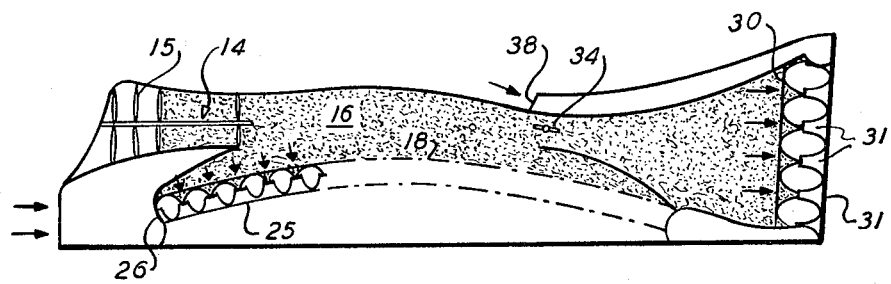
Figure 4:
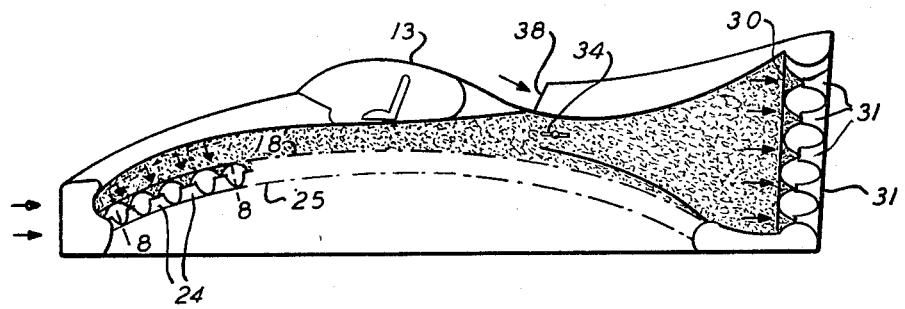
Figure 5:
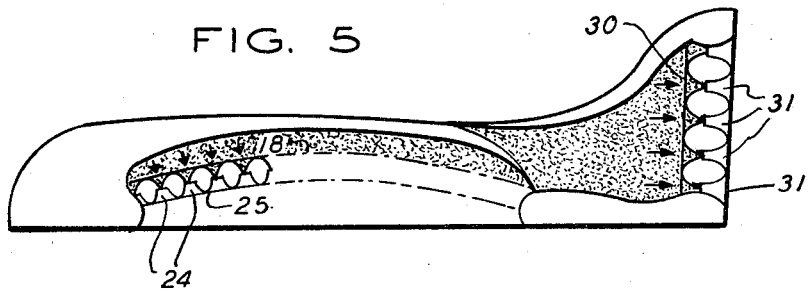
Figure 6:
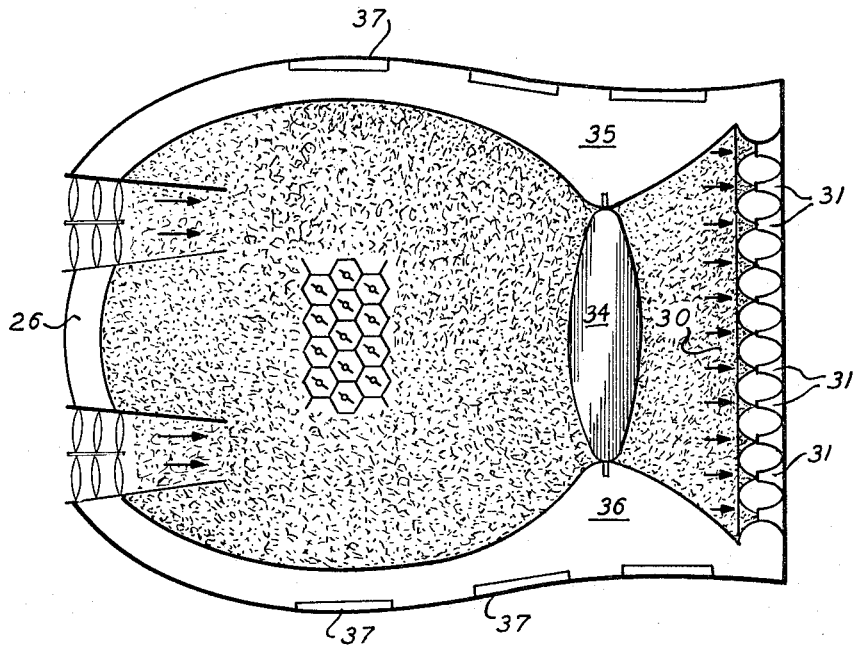
Figure 7:
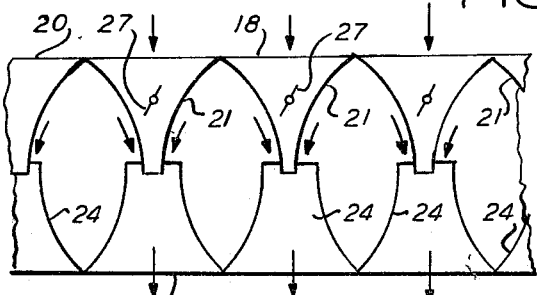
Figure 8:
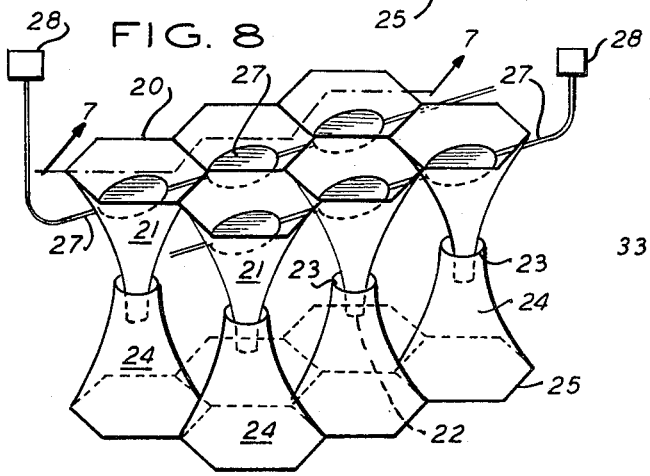
Figure 9:
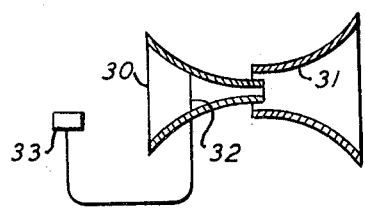

FIGS. 3, 4 and 5 are vertical, longitudinal sectional views taken at lines 3—3, 4—4, 5—5 respectively of FIG. 2, FIG. 6 is a horizontal sectional view taken at line 6—6 of FIG. 1, FIG. 7 is a longitudinal vertical sectional view taken at line 7—7 of FIG. 8, FIG. 8 is a large sectional view taken at line 8—8 of FIG. 4, and FIG. 9 is a schematic, partly sectional view further illustrating application of the invention to the rear of an aircraft.

As shown in the drawings (FIG. 1) an aircarft embodying the invention may include suitable wheels 11, 12, cockpit 13 and instruments, accessories and controls, such as well known in the art and used in connection with the aircraft.

An important feature of the invention is the use of a small stream of high velocity air to induce the flow of ambient air of sufficient quantity to create a thrust force for lift and/or propulsion purposes.

Pursuant to this invention valves with portions interfitting in spaced relation are provided to define a venturi area wherein ambient air will be drawn through the space between the interfitting portions of the valves and thus mixed in the valve with compressed gas flowing through the valve under control. Valves of this type may be in the generally conical form shown in the drawings with interfitting spaced apexes or of other form, with other interfitting portions to the same end. These valves may have butterfly or other flow control means and may be disposed in clusters at suitable positions in the aircraft— for example, as shown in the drawings, they may be assembled as bottom clusters (FIGS. 7 and 8) or aft clusters (FIG. 6); the latter may be suitably controlled by means such as 34 (FIG. 6) or other suitable means. The ambient air flow to the venturi sections of the valves may be from intake ports at suitable locations in the aircraft (37, FIG. 6, 38, FIG. 3) and the means for supplying gas under compression to the valves may be any suitable means to that end such as exemplified at 15 in FIG. 3.

To that end the aircraft is provided with a compressed air means which (FIG. 3) may, as generally indicated at 14, be a suitable power source for driving compressors 15, which may be turbojet, fanjet, jet bypass, reciprocating or any other power source, such as a simple single spool axial flow compressor turbo driven, open at one end (such as the forward end of the aircraft) to the ambient atmosphere, and at the other end to an air chamber or passageway 16 connected with or defined by an air discharge wall defined by a first set of valves 18 forming a valve honeycomb (FIGS. 7 and 3) at the bottom of the aircraft. The bottom wall or first set of valves 18 of the air chamber 16 in point of fact is defined by the large (air intake) ends 20 of the inner or top portions 21 of the first set of valves, which are of suitable contour and may be V-shaped and open at both ends, the (air discharge) openings 22 of the apexes or other discharge ends of top portions 21 of said valves being smaller than and disposed interiorly of the air intake ends 23 of the portions 24 of the valves 18, whose other discharge ends 25 open to the ambient atmosphere at the bottom of the aircraft (and, in point of fact, define the bottom of the aircraft). An ambient air passageway or chamber 26 (FIGS. 1 and 6) opens at the forward or other portion of the aircraft and into or is connected with the spaced interfitting portions 22, 23 of the first set of valves 18 for flow of air therearound and into and through the portions 24 in a venturi effect, mixed with the compressed air flowing through the valves from the intake ends 20 of the valves. The flow of compressed air as a small stream of high velocity through (FIG. 8) the discharge ends 22 of portions 21 of the valves induces the flow of ambient air between the interfitting spaced portions 23 and 22 of the valves and thence through the discharge ends or lower portions 24 of the valves, providing a sufficient quantity of air and direction to create a thrust force of ample mass to lift the aircraft. The flow of compressed air through the first set of valves, to that end, is controlled by suitable butterfly or other means 27, with suitable controls 28 (FIG. 8). The portions 21 and 24 of the valves 18 are preferably honeycomb integrations defining the bottom of the aircraft (FIG. 3) which may be controlled or divided into fractions or sections such as quadrants, to reduce, eliminate, or divert high velocity air and/or ambient air and to thereby change the amounts of directional airflow, resulting in change of attitude. The quadrants may be controlled by control means 28 for the butterfly or other flow regulators 27, to be controlled and work individually or collectively, depending on the results desired. The valves in the lifting body may have flapper type check valves to prevent reverse flow of air. In the event of power failure the gravity effect will induce reverse directional flow through the high velocity portion of the thrust valves and, directed through the rear forward thrusting valves, will enable the aircraft to be controlled.

A second set of valves 30 (FIGS. 6 and 9) is disposed at the rear of the aircraft as a honeycomb covering essentially the entire rear portion of the air compression chamber. As will be noted from FIGS. 3–5, said second set of valves 30 may correspond with the first set of valves 18 and and may similarly have interfitting inner and outer portions. Valves 30 constitute a honeycomb cluster of thrust valves for forward thrusting of the aircraft; butterfly or other control members 32 (FIG. 9) with suitable controls therefor 33 may be provided for control of the flow of air through honeycomb valves 30, in the manner above described in connection with the first set of valves 18.

The compressed air chamber 16 may be provided with means such as butterfly gate valve 34 (FIGS. 6 and 3) and suitable controls therefor, for regulating or selectively cutting off the flow of pressurized air from the compressed air chamber 16 to the honeycomb clusters of valves 30 to induce or stop the forward thrust of the aircraft. Ambient air passageways 26, 35, 36 may (FIG. 6) be provided in the aircraft for supplying ambient air to the valves 31, and suitable intake doors 37 provided along the sides (FIG. 6) of other portions of the aircraft for that purpose. Butterfly vanes or members 27 (FIG. 7) control the airflow for attitude control, thrust valves 18 using compressed air and ambient air picked up in the venturi effect intermediate the portions 22, 23 thereof for a mass of sufficient quantity to lift and propel the aircraft. A further ambient air intake passageway 38 may be provided at the top of the aircraft (FIGS. 1 and 2) and to direct the flow of the air in conjunction with the passageways 35 and 36 to the rear thrust valves as above described. While I have shown, in the drawings, typical valve constructions suitable for carrying out the invention, other types of subsonic and supersonic valves with nozzles and diffusers may be used pursuant to the invention as honeycombs at the bottom and/or rear of aircraft.

While the foregoing disclosure of exemplary embodiments is made in accordance with the Patent Statutes, it is to be understood that the invention is not limited thereto or thereby, the inventive scope being defined in the appended claims.

I claim:

1. An aircraft comprising: an elongated body member having at least front and bottom portions opening to the ambient air; air compressor means in the aircraft including an inlet connected to the ambient air and a pressure outlet for delivering air under pressure; a set of valves disposed at least in the bottom portion of the aircraft and opening onto the ambient air, each of said valves comprising a truncated hollow substantially conical outlet member and a hollow conical inlet member including an apex orifice, said outlet and inlet members being substantially coaxially aligned with the apex of said inlet member extending via the truncated end of said outlet member to within said outlet member so that said members are disposed in spaced interfitting relationship, said member being connected to said air compressor means so that compressed air flows from said inlet member to said outlet member; and means in said aircraft for guiding ambient air from the front portion thereof around and between the so spaced and interfitting regions of the inlet and outlet members of said valves, whereby the flow of compressed air from said inlet members to and through said outlet members of said valves induces a venturi flow of ambient air through said regions and said outlet members to the atmosphere beneath the aircraft, for lift and propulsion.

2. In an aircraft as set forth in claim 1, means positioned in the valves to control the flow of compressed air therethrough, to thereby control the mass of ambient air so drawn into and discharged therefrom.

3. In an aircraft as set forth in claim 1, means rotatably positioned in the valves and proportioned to selectively close and open the same, thereby controlling the flow of compressed air through the valves.

4. In an aircraft as set forth in claim 1, the valves being positioned as a contiguous honeycomb at the bottom of the aircraft opening into the air compression means.

5. In an aircraft as set forth in claim 1, valves being positioned as a honeycomb at the bottom of the aircraft contiguous and discharging into the ambient air beneath the aircraft.

6. In an aircraft as set forth in claim 3, said means so connected with the valves for selectively opening and closing them for achieving selective air flow.

7. In an aircraft as set forth in claim 3, another set of valves disposed at the rear of the aircraft, an air passageway connecting the valves with said air compression means, interfitting spaced portions in said valves and ambient air means connected with said interfitting portions.

8. In an aircraft as set forth in claim 7 means disposed in the air passageway for controlling the flow of compressed air to another set of valves.

9. In an aircraft as set forth in claim 8, said other set of valves being disposed parallel to the longitudinal axis of the aircraft.

10. In an aircraft as set forth in claim 8, means for selectively controlling the said other set of valves.

References Cited by the Examiner

UNITED STATES PATENTS

| 1,585,281 | 5/1926 | Craddock | 244—23 |
| 2,734,699 | 2/1956 | Lippisch | 244—23 |
| 2,922,277 | 1/1960 | Bertin | 180—7 |
| 2,932,468 | 4/1960 | Kappus | 244—23 |

FOREIGN PATENTS

| 1,158,540 | 1/1948 | France. |

MILTON BUCHLER, *Primary Examiner.*

L. C. HALL, A. E. CORRIGAN, *Assistant Examiners.*